(12) United States Patent
Chuang et al.

(10) Patent No.: US 8,610,836 B2
(45) Date of Patent: Dec. 17, 2013

(54) ELECTRONIC DISPLAY DEVICE

(75) Inventors: Yu-Ling Chuang, Taipei (TW); Tzu-Hung Cheng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 125 days.

(21) Appl. No.: 13/193,328

(22) Filed: Jul. 28, 2011

(65) Prior Publication Data

US 2012/0307162 A1 Dec. 6, 2012

(30) Foreign Application Priority Data

Jun. 3, 2011 (TW) .............................. 100119528 A

(51) Int. Cl.
*H04N 5/66* (2006.01)
*H04N 9/12* (2006.01)
*H04N 5/04* (2006.01)
*H04N 9/44* (2006.01)
*G06F 3/00* (2006.01)
*G06F 3/02* (2006.01)
*G09G 5/00* (2006.01)

(52) U.S. Cl.
USPC ........... 348/739; 348/500; 348/158; 715/700; 345/169

(58) Field of Classification Search
None
See application file for complete search history.

(56) References Cited

U.S. PATENT DOCUMENTS

| | | | | |
|---|---|---|---|---|
| 2004/0090424 | A1* | 5/2004 | Hurley et al. | 345/169 |
| 2009/0295991 | A1* | 12/2009 | Stafford et al. | 348/500 |
| 2009/0327885 | A1* | 12/2009 | Aoki et al. | 715/700 |
| 2011/0085041 | A1* | 4/2011 | Kildevaeld | 348/158 |

\* cited by examiner

*Primary Examiner* — Jefferey Harold
*Assistant Examiner* — Sean Haiem
(74) *Attorney, Agent, or Firm* — Kirton McConkie; Evan R. Witt

(57) ABSTRACT

An electronic display device includes a storage device for storing an image file, a display screen for showing the image file, a positive evaluation button, and a statistical program. The electronic display device is in communication with a social website. When the positive evaluation button is pressed down, a positive evaluation signal is generated. The statistical program has a preset evaluation threshold value. The statistical program generates an evaluation value according to the positive evaluation signal. If the evaluation value is greater than or equal to the evaluation threshold value, the image file is transmitted to the social website.

8 Claims, 5 Drawing Sheets

ELECTRONIC DISPLAY DEVICE

FIELD OF THE INVENTION

The present invention relates to an electronic display device, and more particularly to an electronic display device for playing image files.

BACKGROUND OF THE INVENTION

With increasing development of science and technology, an electronic display device has become a very popular consumer electronic device. The main function of the electronic display device is to output image files. Generally, the image files comprise static electronic files (e.g. photos) and dynamic electronic files (e.g. movies). For example, the electronic display device is a TV set, a computer screen, a digital photo frame, a digital signage, or the like.

Hereinafter, the configurations of a conventional electronic display device will be illustrated with reference to FIGS. 1 and 2. FIG. 1 is a schematic perspective view illustrating the outward appearance of a conventional electronic display device. FIG. 2 is a schematic perspective view illustrating the outward appearance of the conventional electronic display device of FIG. 1 and taken along another viewpoint. For example, the conventional electronic display device 1 shown in FIGS. 1 and 2 is a digital photo frame. The conventional electronic display device 1 comprises a display screen 10, a storage device 11 and a connecting slot 12. The storage device 11 is disposed within the electronic display device 1 for storing at least one image file P1. The display screen 10 is disposed on a surface 13 of the electronic display device 1. The display screen 10 is in communication with the storage device 11 for showing the stored image file P1. The connecting slot 12 is located at a sidewall 14 of the electronic display device 1. When a memory card 15 is inserted into the connecting slot 12, the memory card 15 is accommodated within the connecting slot 12. The memory card 15 is used for storing the image file P1. Since the memory capacity of the built-in storage device 11 is limited, the connecting slot 12 is usually a necessary component of the electronic display device 1 for accommodating the memory card 15. By means of the above configurations, the electronic display device 1 is capable of showing the image file P1.

Recently, as the science and technology are increasingly developed, more and more computers actively join social websites as members and utilize social websites to communicate with each other. Moreover, the member of a social website can upload the image file P1 to the social website. Consequently, other computer users can watch and evaluate the image file P1. In a case that the image file P1 is positively evaluated by so many other computer users, it means that the image file P1 win recognition by the public. Moreover, the image file P1 may be shown through the memory card and the electronic display device 1. However, this way of showing the image file P1 is very troublesome. For solving the above drawbacks, a network-enabled electronic display device is disclosed.

FIG. 3 schematically illustrates a conventional network-enabled electronic display device is in communication with a social website. The network-enabled electronic display device 2 comprises a display screen 20, a storage device 21 and a network module 23. The relationships between the display screen 20, the storage device 21 and the connecting slot are similar to those of the conventional electronic display device as shown in FIG. 1, and are not redundantly described herein. The network module 23 is disposed within the electronic display device 2 and connected with the storage device 21. When the network module 23 is in communication with a social website F, the image file P1 stored in the storage device 21 can be copied by the network module 23 and then transmitted to the social website F.

The network-enabled electronic display device 2 is able to directly transmit the image file P1 without the need of using the memory card. However, the network-enabled electronic display device 2 still has some drawbacks. For example, the network-enabled electronic display device 2 only has the function of playing the image files, but the network-enabled electronic display device 2 fails to transmit the favorite image file P1 of most users to the social website F through network connection according to the opinions of most users. Therefore, there is a need of providing an electronic display device capable of automatically transmitting an image file to a social website according to the public opinions.

SUMMARY OF THE INVENTION

The present invention relates to an electronic display device capable of automatically transmitting an image file to a social website according to the public opinions.

In accordance with an aspect of the present invention, there is provided an electronic display device in communication with a social website. The electronic display device includes a storage device, a display screen, a positive evaluation button and a statistical program. The storage device is used for storing an image file. The display screen is disposed on a surface of the electronic display device and in communication with the storage device for showing the image file. The positive evaluation button is disposed on the surface of the electronic display device. When the positive evaluation button is pressed down, a positive evaluation signal is generated. The statistical program is installed in the electronic display device for receiving the positive evaluation signal and generating an evaluation value according to the positive evaluation signal. The statistical program has a preset evaluation threshold value. If the evaluation value is greater than or equal to the evaluation threshold value, the image file is transmitted to the social website.

In an embodiment, when the positive evaluation signal is received by the statistical program once, the evaluation value of the statistical program is increased by 1.

In an embodiment, the electronic display device further includes a negative evaluation button. When the negative evaluation button is pressed down, a negative evaluation signal is generated. When the positive evaluation signal is received by the statistical program once, the evaluation value of the statistical program is increased by 1. Whereas, when the negative evaluation signal is received by the statistical program once, the evaluation value of the statistical program is decreased by 1.

In an embodiment, the positive evaluation button is a physical button disposed on the surface of the electronic display device and arranged in the vicinity of the display screen, or the positive evaluation button is an on-touch button shown on the display screen. Moreover, the negative evaluation button is another physical button disposed on the surface of the electronic display device and arranged in the vicinity of the display screen, or the negative evaluation button is another on-touch button shown on the display screen.

In an embodiment, the storage device is a built-in disk space of the electronic display device, or the storage device is a memory card inserted into a connecting slot of the electronic display device, or the storage device is a removable storage device.

In an embodiment, the electronic display device further includes a network module, which is disposed within the electronic display device and connected with the storage device. The network module is in communication with the social website through Internet connection or in a wireless network communication manner, so that the image file stored in the storage device is copied and transmitted to the social website.

In an embodiment, after the image file is transmitted to the social website, if the positive evaluation button is pressed down, the positive evaluation signal is generated and transmitted to the social website by the statistical program, so that a positive evaluation message corresponding to the positive evaluation signal is shown on the social website.

In accordance with another aspect of the present invention, there is provided an electronic display device in communication with a social website. The electronic display device includes a storage device, a display screen, a first positive evaluation button, a second positive evaluation button and a statistical program. The storage device is used for storing a first image file and a second image file. The display screen is disposed on a surface of the electronic display device and in communication with the storage device for showing the first image file and the second image file. The first positive evaluation button is disposed on the surface of the electronic display device and corresponding to the first image file. When the first positive evaluation button is pressed down, a first positive evaluation signal is generated. The second positive evaluation button is disposed on the surface of the electronic display device and corresponding to the second image file. When the second positive evaluation button is pressed down, a second positive evaluation signal is generated. The statistical program is installed in the electronic display device for receiving the first positive evaluation signal and the second positive evaluation signal, and generating a first evaluation value and a second evaluation value according to the first positive evaluation signal and the second positive evaluation signal, respectively. The statistical program has a preset evaluation time period. If the first evaluation value is greater than the second evaluation value after the evaluation time period, the first image file is transmitted to the social website. Whereas, if the second evaluation value is greater than the first evaluation value after the evaluation time period, the second image file is transmitted to the social website.

In an embodiment, the electronic display device further includes a first negative evaluation button and a second negative evaluation button. When the first negative evaluation button and the second negative evaluation button are pressed down, a first negative evaluation signal and a second negative evaluation signal are respectively generated. When the first positive evaluation signal and the second positive evaluation signal are received by the statistical program once, the first evaluation value and the second evaluation value of the statistical program are respectively increased by 1. Whereas, when the first negative evaluation signal and the second negative evaluation signal are received by the statistical program once, the first evaluation value and the second evaluation value of the statistical program are respectively decreased by 1.

In an embodiment, the first positive evaluation button and the second positive evaluation button are two physical buttons disposed on the surface of the electronic display device and arranged in the vicinity of the display screen, or the first positive evaluation button and the second positive evaluation button are two on-touch buttons shown on the display screen. Moreover, the first negative evaluation button and the second negative evaluation button are other two physical buttons disposed on the surface of the electronic display device and arranged in the vicinity of the display screen, or the first negative evaluation button and the second negative evaluation button are other two on-touch buttons shown on the display screen.

In an embodiment, the electronic display device further includes a network module, which is disposed within the electronic display device and connected with the storage device. The network module is in communication with the social website through Internet connection or in a wireless network communication manner, so that the first image file or the second image file stored in the storage device is copied and transmitted to the social website.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
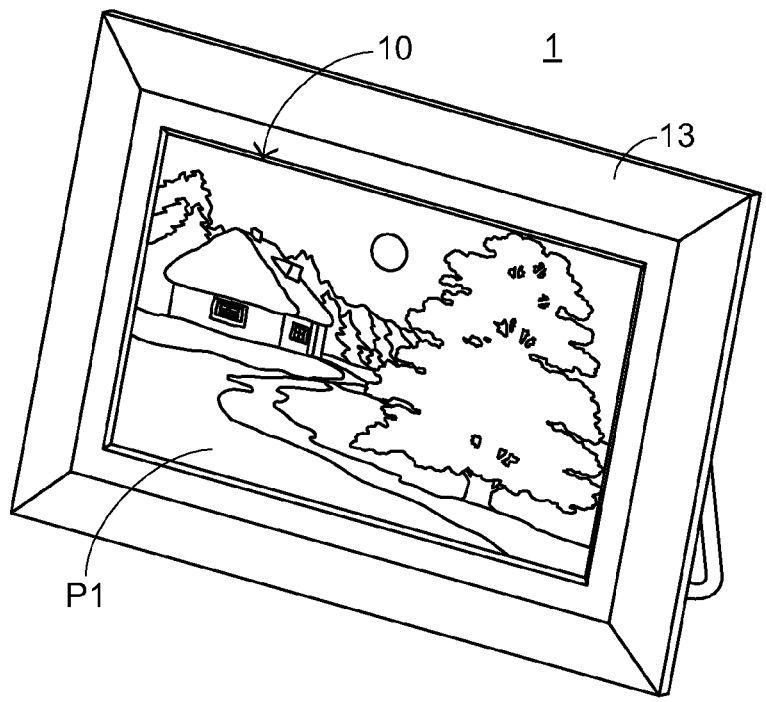
FIG. 1 is a schematic perspective view illustrating the outward appearance of a conventional electronic display device.
Figure 2:
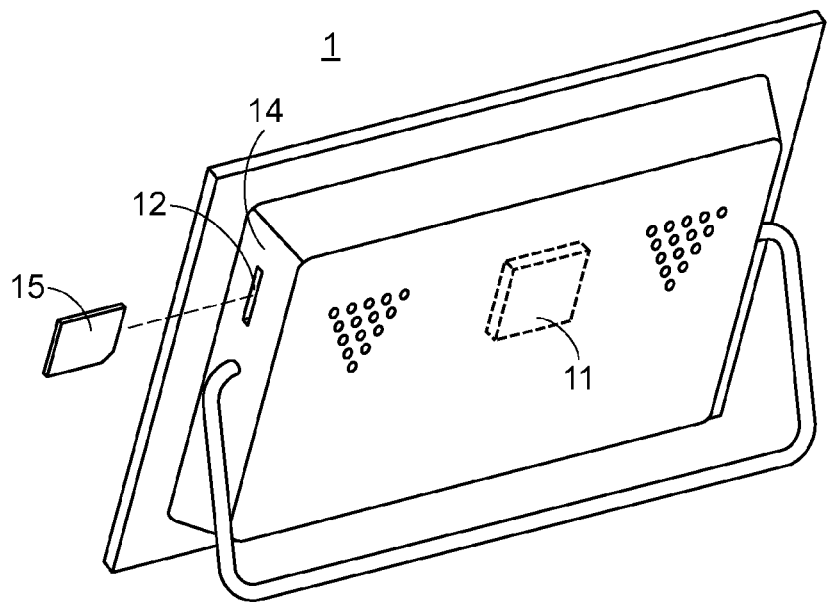
FIG. 2 is a schematic perspective view illustrating the outward appearance of the conventional electronic display device of FIG. 1 and taken along another viewpoint.
Figure 3:
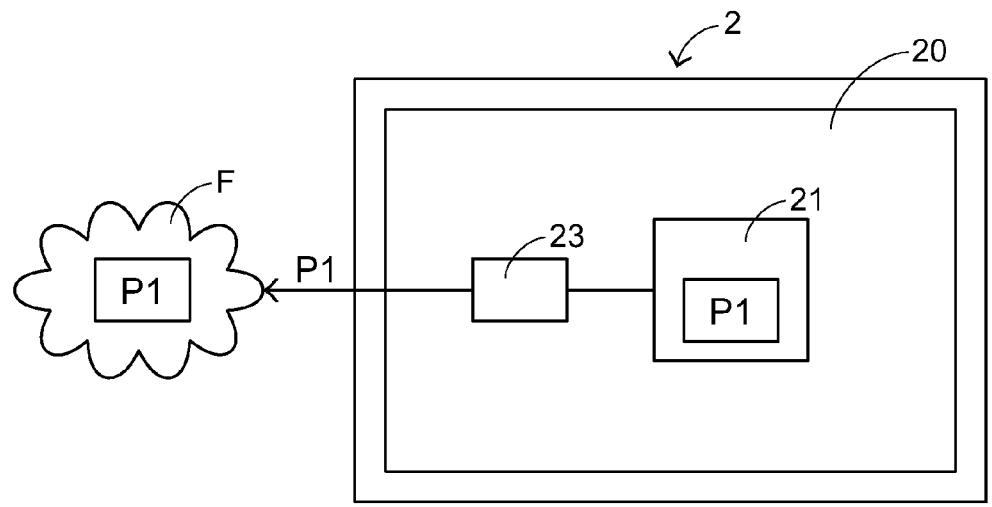
FIG. 3 schematically illustrates a conventional internet-enabled electronic display device in communication with a social website.
Figure 4:
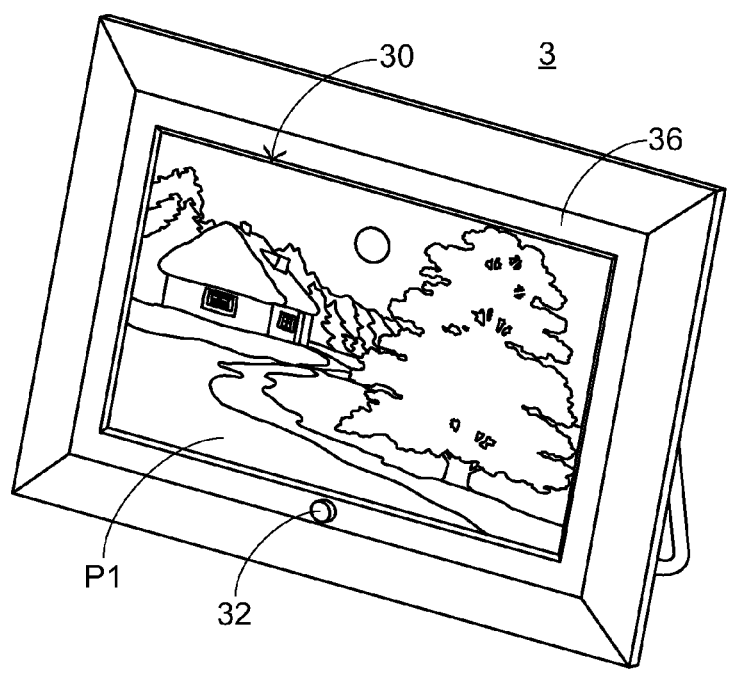
FIG. 4 is a schematic perspective view illustrating the outward appearance of an electronic display device according to a first embodiment of the present invention.
Figure 5:
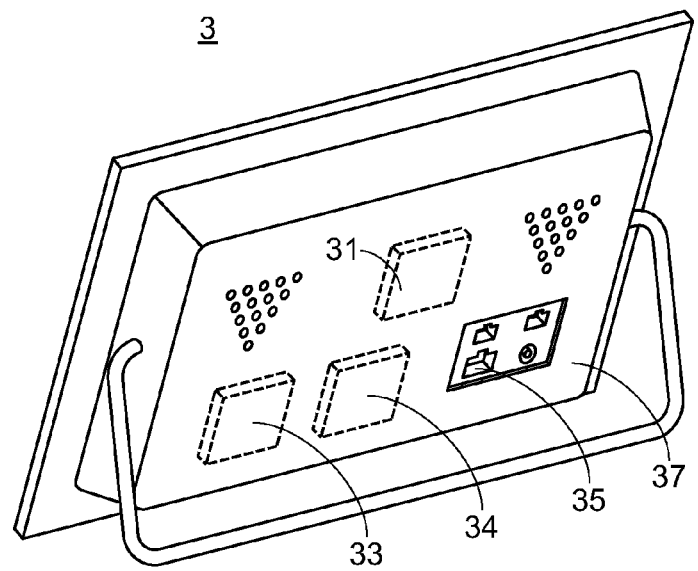
FIG. 5 is a schematic perspective view illustrating the outward appearance of the electronic display device of FIG. 4 and taken along another viewpoint.

For obviating the drawbacks encountered from the prior art, the present invention provides an electronic display device. FIG. 4 is a schematic perspective view illustrating the outward appearance of an electronic display device according to a first embodiment of the present invention. FIG. 5 is a schematic perspective view illustrating outward appearance of the electronic display device of FIG. 4 and taken along another viewpoint. Please refer to FIGS. 4 and 5. The electronic display device 3 comprises a display screen 30, a storage device 31, a positive evaluation button 32, a statistical program 33, a network module 34 and a network cable slot 35. The display screen 30 is disposed on a surface 36 of the electronic display device 3. In addition, the positive evaluation button 32 is disposed on the surface 36 of the electronic display device 3 and arranged in the vicinity of the display screen 30. When the positive evaluation button 32 is pressed down, a positive evaluation signal Sg (see FIG. 6) is generated. The storage device 31 is disposed within the electronic display device 3 and in communication with the display screen 30. The storage device 31 is used for storing at least one image file P1. The image files comprise static electronic files (e.g. photos) and dynamic electronic files (e.g. movies). The display screen 30 is used for showing the stored image file P1. In this embodiment, the electronic display device 3 is a digital photo frame. Moreover, the positive evaluation button 32 is a physical button disposed on the surface 36 of the electronic display device 3. The storage device 31 is a disk space, which is disposed within the electronic display device 3.

Figure 6:
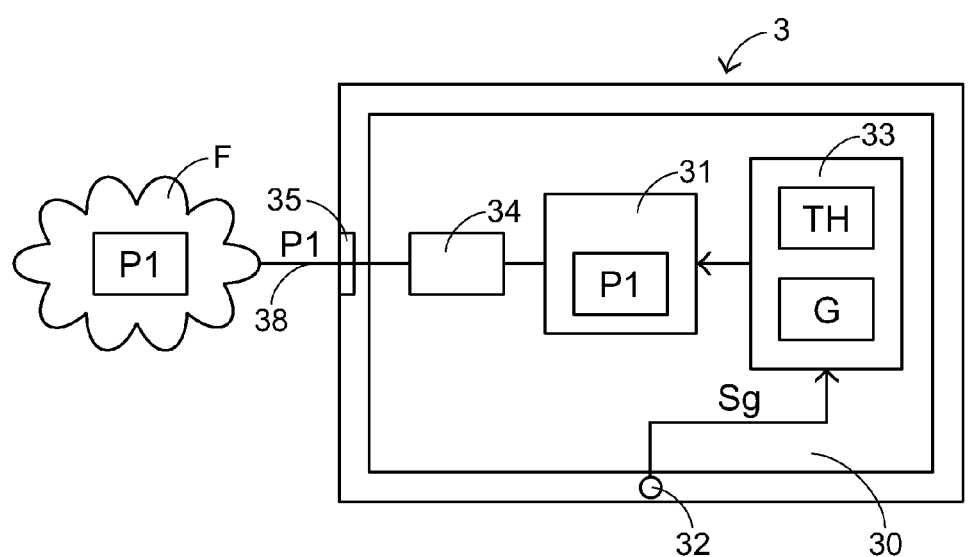
FIG. 6 schematically illustrates an electronic display device in communication with a social website according to the first embodiment of the present invention.

The statistical program 33 is installed in the electronic display device 3, and has a preset evaluation threshold value TH (see also FIG. 6). In an embodiment, the preset evaluation threshold value TH is 50. The statistical program 33 is used for receiving the positive evaluation signal Sg and generating an evaluation value G (see also FIG. 6) according to the positive evaluation signal Sg. The network module 34 is disposed within the electronic display device 3 and connected with the storage device 31. The image file P1 stored in the storage device 31 may be copied by the network module 34 and then transmitted from the network module 34 to a social website F. The network cable slot 35 is located at another surface 37 of the electronic display device 3. When a network cable 38 (see FIG. 6) is connected with the electronic display device 3, the connection between the network module 34 and the network cable 38 is established, so that the electronic display device 3 can be in communication with the social website F through Internet connection. In an embodiment, the social website F is a Facebook social website.

Hereinafter, the operations of the electronic display device 3 will be illustrated with reference to FIG. 6. FIG. 6 schematically illustrates an electronic display device in communication with a social website according to the first embodiment of the present invention. In a case that the user wants to collect the public opinions about the shooting quality of the image file P1, the electronic display device 3 may be located at a frequently-visited public place of a crowd of people and in communication with the social website F. After the electronic display device 3 is completely set up, the image file P1 is repeatedly played and shown on the display screen 30 of the electronic display device 3. When the image file P1 shown on the display screen 30 is watched by a first observer passing through the electronic display device 3, if the first observer likes the image file P1, the positive evaluation button 32 on the surface 36 of the electronic display device 3 may be pressed down by the first observer to generate a corresponding positive evaluation signal Sg. After the positive evaluation signal Sg is received by the statistical program 33, the statistical program 33 generates an evaluation value G. Meanwhile, the evaluation value G is 1. When the positive evaluation signal Sg is received by the statistical program 33 once, the statistical program 33 will increase the evaluation value G by 1.

Similarly, if so many observers passing through the electronic display device 3 like the image file P1, the positive evaluation button 32 on the surface 36 of the electronic display device 3 may be pressed down by these observers to generate corresponding positive evaluation signals Sg. As the positive evaluation signals Sg are successively received by the statistical program 33, the evaluation value G is increasingly increased by the statistical program 33. If the evaluation value G obtained by the statistical program 33 is greater than or equal to the preset evaluation threshold value TH, the image file P1 is transmitted to the social website F through the network module 34 and the network cable 38 through Internet connection, so that the image file P1 can be watched by the users of the social website F. After the image file P1 is transmitted to the social website F, if the positive evaluation button 32 of the electronic display device 3 is continuously by the observer passing through the electronic display device 3, the positive evaluation signal Sg is still generated. Under this circumstance, the image file P1 is no longer transmitted by the statistical program 33, but the positive evaluation signal Sg is transmitted to the social website F. In response to the positive evaluation signal Sg, a corresponding positive evaluation message L is shown on the social website F. For example, the positive evaluation message L denoting the meaning "Like" will be shown on the social website F. In other words, since the social website F is transmitted to the social website F and the public opinion about the shooting quality of the image file P1 is collected by the public, the user of the electronic display device 3 can assure the good quality of the image file P1 without the need of using the naked eyes to recognize the image file P1.

Similarly, after the image file P1 has been repeatedly played and shown on the display screen 30 of the electronic display device 3 for a certain time period, if the image file P1 has not been transmitted to the social website F, it means that the image file P1 is not liked by many observers. According to the opinions of most observers, the user may determine whether the image file P1 is transmitted to the social website F or not.

Figure 7:
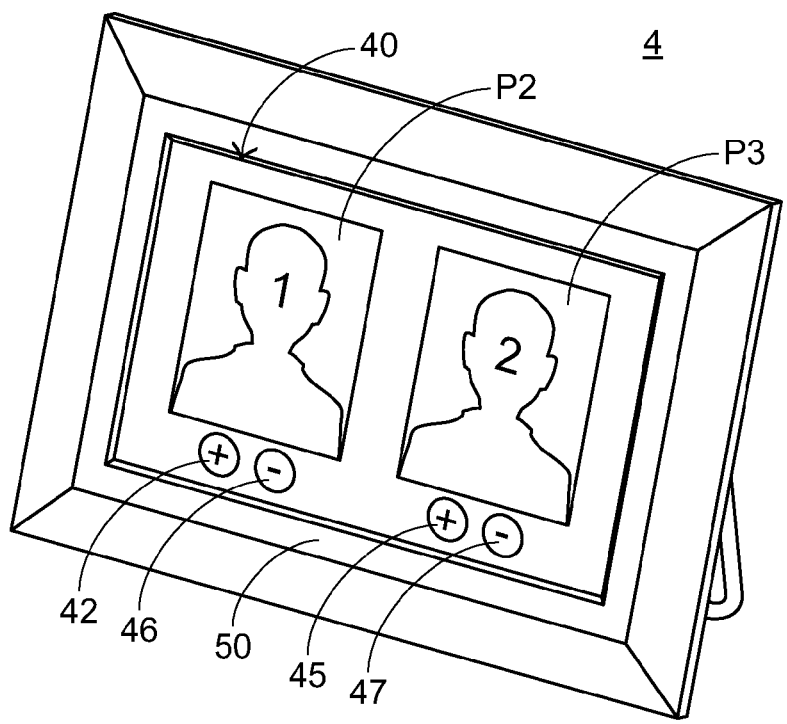
FIG. 7 is a schematic perspective view illustrating the outward appearance of an electronic display device according to a second embodiment of the present invention.
Figure 8:
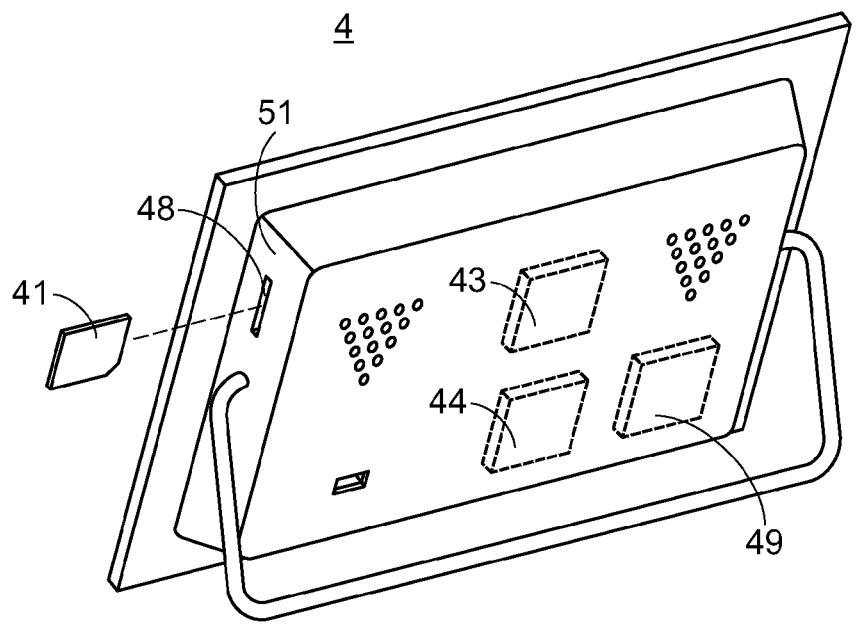
FIG. 8 is a schematic perspective view illustrating the outward appearance of the electronic display device of FIG. 7 and taken along another viewpoint.

The present invention further provides a second embodiment of an electronic display device. FIG. 7 is a schematic perspective view illustrating the outward appearance of an electronic display device according to a second embodiment of the present invention. FIG. 8 is a schematic perspective view illustrating the outward appearance of the electronic display device of FIG. 7 and taken along another viewpoint. Please refer to FIGS. 7 and 8. The electronic display device 4 comprises a display screen 40, a storage device 41, a first positive evaluation button 42, a statistical program 43, a network module 44, a first negative evaluation button 45, a second positive evaluation button 46, a second negative evaluation button 47, a connecting slot 48 and a waiting program 49. The display screen 40 is disposed on a surface 50 of the electronic display device 4. In addition, the first positive evaluation button 42 and the second positive evaluation button 46 are disposed on the electronic display device 4. When the first positive evaluation button 42 and the second positive evaluation button 46 are pressed down, a first positive evaluation signal Sg1 and a second positive evaluation signal Sg2 (see FIG. 9) are respectively generated. The first negative evaluation button 45 and the second negative evaluation button 47 are also disposed on the display screen 40. When the first negative evaluation button 45 and the second negative evaluation button 47 are pressed down, a first negative evaluation signal Sb1 and a second negative evaluation signal Sb2 (see FIG. 9) are respectively generated. In this embodiment, the electronic display device 4 is a digital photo frame. Moreover, the first positive evaluation button 42, the first negative evaluation button 45, the second positive evaluation button 46 and the second negative evaluation button 47 are on-screen buttons shown on the electronic display device 4.

The storage device 41 is in communication with the display screen 40 for storing a first image file P2 and a second image file P3. The first image file P2 and the second image file P3 can be simultaneously or sequentially shown on the display screen 40. The connecting slot 48 is located at a sidewall 51 of the electronic display device 4. When a storage device 41 is inserted into the connecting slot 48, the storage device 41 is accommodated within the connecting slot 48. In this embodiment, the storage device 41 is a memory card inserted into the connecting slot 48. An example of the storage device 41 includes but is not limited to a compact flash (CF) memory card, a multimedia card (MMC), a memory stick (MS) or a secure digital (SD) memory card. Moreover, the first image file P2 and the second image file P3 stored in the storage device 41 are simultaneously shown on the display screen 40. Moreover, the first positive evaluation button 42 and the first negative evaluation button 45 are located under the first image file P2, and the second positive evaluation button 46 and the second negative evaluation button 47 are located under the second image file P3 (see FIG. 7).

Figure 9:
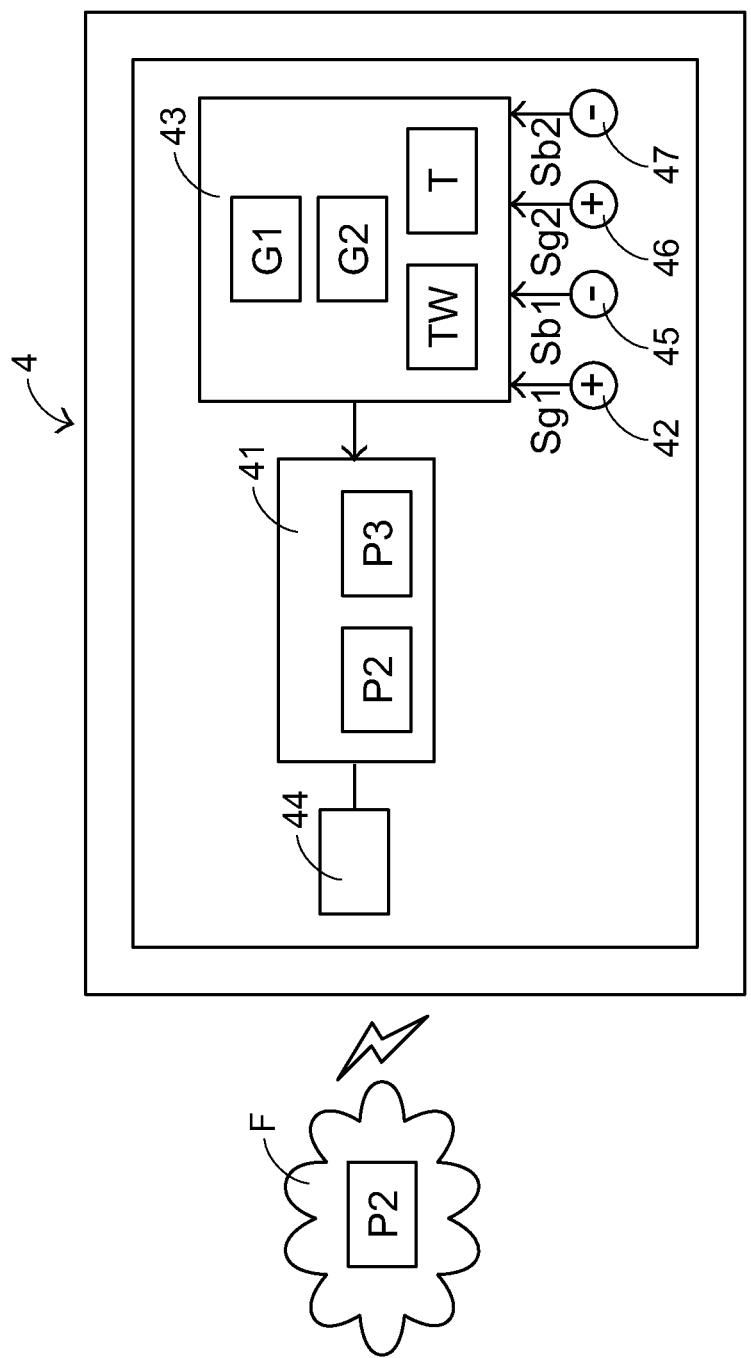
FIG. 9 schematically illustrates an electronic display device in communication with a social website according to the second embodiment of the present invention.

The statistical program 43 is installed in the electronic display device 4 and has a preset evaluation time period T (see FIG. 9). For example, the preset evaluation time period T is 5 hours. The statistical program 43 is used for receiving the first positive evaluation signal Sg1, the first negative evaluation signal Sb1, the second positive evaluation signal Sg2 and the second negative evaluation signal Sb2. According to the first positive evaluation signal Sg1 and the first negative evaluation signal Sb1, the statistical program 43 generates a first evaluation value G1 (see FIG. 9). In addition, according to the second positive evaluation signal Sg2 and the second negative evaluation signal Sb2, the statistical program 43 generates a second evaluation value G2 (see FIG. 9). The network module 44 is disposed within the electronic display device 4 and connected with the storage device 41. The first image file P2 or the second image file P3 stored in the storage device 41 may be copied by the network module 44 and transmitted from the network module 44 to a social website F. In this embodiment, the network module 44 is in communication with the social website F in a wireless network communication manner. In an embodiment, the social website F is a Facebook social website, and the wireless network communication manner is a 3G wireless network communication manner, a 4G wireless network communication manner, a wireless fidelity (Wi-Fi) communication manner, a general packet radio service (GPRS) communication manner or an Edge network communication manner.

The waiting program 49 is installed in the electronic display device 4 and has a preset waiting time Tw. When one of the first positive evaluation button 42, the first negative evaluation button 45, the second positive evaluation button 46 and the second negative evaluation button 47 is pressed down once, the connection between the first positive evaluation button 42, the first negative evaluation button 45, the second positive evaluation button 46 and the second negative evaluation button 47 and the statistical program 43 will be interrupted. After the connection has been interrupted for the waiting time Tw, the connection between the first positive evaluation button 42, the first negative evaluation button 45, the second positive evaluation button 46 and the second negative evaluation button 47 and the statistical program 43 will be established again. Due to the preset waiting time Tw of the waiting program 49, the possibility of pressing down the first positive evaluation button 42, the first negative evaluation button 45, the second positive evaluation button 46 or the second negative evaluation button 47 by the same observer will be minimized. That is, the evaluation fairness will be enhanced. In an embodiment, the preset waiting time Tw is 10 seconds.

Hereinafter, the operations of the electronic display device 4 will be illustrated with reference to FIG. 9. FIG. 9 schematically illustrates an electronic display device in communication with a social website according to the second embodiment of the present invention. In this embodiment, the first image file P2 and the second image file P3 are the photos of two service staffs of a store. For example, the first image file P2 is a photo of a first service staff, and the second image file P3 is a photo of a second service staff.

When the user of the electronic display device 4 wants to select a best service staff from the first service staff and the second service staff, the electronic display device 4 may be placed on a conspicuous position of the store. Then, the electronic display device 4 is in communication with the social website F. After the electronic display device 4 is completely set up, the first image file P2 and the second image file P3 are repeatedly played and shown on the display screen 40 of the electronic display device 4. When the first image file P2 and the second image file P3 shown on the display screen 40 are watched by a first observer passing through the electronic display device 4, if the first observer likes the first service staff in the first image file P2, the first positive evaluation button 42 under the first image file P2 and shown on the display screen 40 may be pressed down by the first observer to generate a corresponding first positive evaluation signal Sg1. Whereas, if the first observer does not like the first service staff in the first image file P2, the first negative evaluation button 45 under the first image file P2 and shown on the display screen 40 may be pressed down by the first observer to generate a corresponding first negative evaluation signal Sb1. After the first positive evaluation signal Sg1 is received by the statistical program 43, the statistical program 43 generates a first evaluation value G1. Meanwhile, the first evaluation value G1 is 1. Similarly, after the first negative evaluation signal Sb1 is received by the statistical program 43, the statistical program 43 generates a first evaluation value G1 corresponding to the first image file P2. Meanwhile, the first evaluation value G1 is −1. When the first positive evaluation signal Sg1 is received by the statistical program 43 once, the statistical program 43 will increase the first evaluation value G1 by 1. When the first negative evaluation signal Sb1 is received by the statistical program 43 once, the statistical program 43 will decrease the first evaluation value G1 by 1.

Similarly, if the first observer likes the second service staff in the second image file P3, the second positive evaluation button 46 under the second image file P3 and shown on the display screen 40 may be pressed down by the first observer to generate a corresponding second positive evaluation signal Sg2. Whereas, if the first observer does not like the first service staff in the second image file P3, the second negative evaluation button 47 under the second image file P3 and shown on the display screen 40 may be pressed down by the first observer to generate a corresponding second negative evaluation signal Sb2. After the second positive evaluation signal Sg2 is received by the statistical program 43, the statistical program 43 generates a second evaluation value G2. Meanwhile, the second evaluation value G2 is 1. Similarly, after the second negative evaluation signal Sb2 is received by the statistical program 43, the statistical program 43 generates a second evaluation value G2 corresponding to the second image file P3. Meanwhile, the second evaluation value G2 is −1. When the second positive evaluation signal Sg2 is received by the statistical program 43 once, the statistical program 43 will increase the second evaluation value G2 by 1. When the second negative evaluation signal Sb2 is received by the statistical program 43 once, the statistical program 43 will decrease the second evaluation value G2 by 1.

After the first positive evaluation button 42, the first negative evaluation button 45, the second positive evaluation button 46 or the second negative evaluation button 47 is received by the statistical program 43 at the first time, the statistical program 43 starts counting time. After the statistical program 43 has counted time for the evaluation time period T (e.g. 5 hours), the evaluation is ended and the first evaluation value G1 is compared with the second evaluation value G2. If the first evaluation value G1 is greater than the second evaluation value G2, the first image file P2 is transmitted to the social website F and shown on the social website F to be watched (see FIG. 9). Whereas, if the second evaluation value G2 is greater than the first evaluation value G1, the second image file P3 is transmitted to the social website F.

In the above embodiments, the storage device is a built-in disk space of the electronic display device or the external memory card. In some embodiments, the storage device is a removable storage device.

From the above description, the electronic display device of the present invention provides a public screening mechanism. The collection of the public opinions may help the user assess whether the image file shown on the electronic display device is welcome by the public. Moreover, if the image file to be evaluated wins recognition by the public, this image file is automatically transmitted to the social website. In some embodiments, the electronic display device of the present invention may be applied to a voting activity of selecting the best service staff of a store or a popular voting activity of a talent-searching show. The image file with the highest positive evaluation value will be automatically transmitted to the social website.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic display device in communication with a social website, said electronic display device comprising:
    a storage device for storing an image file;
    a display screen disposed on a surface of said electronic display device and in communication with said storage device for showing said image file;
    a positive evaluation button disposed on said surface of said electronic display device, wherein when said positive evaluation button is pressed down, a positive evaluation signal is generated;
    a statistical program installed in said electronic display device for receiving said positive evaluation signal and generating an evaluation value according to said positive evaluation signal, wherein said statistical program has a preset evaluation threshold value, wherein if said evaluation value is greater than or equal to said evaluation threshold value, said image file is transmitted to said social website; and
    a negative evaluation button, wherein when said negative evaluation button is pressed down, a negative evaluation signal is generated, wherein when said positive evaluation signal is received by said statistical program once, said evaluation value of said statistical program is increased by 1, wherein when said negative evaluation signal is received by said statistical program once, said evaluation value of said statistical program is decreased by 1.

2. The electronic display device according to claim 1 wherein said positive evaluation button is a physical button disposed on said surface of said electronic display device and arranged in the vicinity of said display screen, or said positive evaluation button is an on-touch button shown on said display screen, wherein said negative evaluation button is another physical button disposed on said surface of said electronic display device and arranged in the vicinity of said display screen, or said negative evaluation button is another on-touch button shown on said display screen.

3. The electronic display device according to claim 1 wherein said storage device is a built-in disk space of said electronic display device, or said storage device is a memory card inserted into a connecting slot of said electronic display device, or said storage device is a removable storage device.

4. The electronic display device according to claim 1 further comprising a network module, which is disposed within said electronic display device and connected with said storage device, wherein said network module is in communication with said social website through Internet connection or in a wireless network communication manner, so that said image file stored in said storage device is copied and transmitted to said social website.

5. The electronic display device according to claim 1 wherein after said image file is transmitted to said social website, if said positive evaluation button is pressed down, said positive evaluation signal is generated and transmitted to said social website by said statistical program, so that a positive evaluation message corresponding to said positive evaluation signal is shown on said social website.

6. An electronic display device in communication with a social website, said electronic display device comprising:
    a storage device for storing a first image file and a second image file;
    a display screen disposed on a surface of said electronic display device and in communication with said storage device for showing said first image file and said second image file;
    a first positive evaluation button disposed on said surface of said electronic display device and corresponding to said first image file, wherein when said first positive evaluation button is pressed down, a first positive evaluation signal is generated;
    a second positive evaluation button disposed on said surface of said electronic display device and corresponding to said second image file, wherein when said second positive evaluation button is pressed down, a second positive evaluation signal is generated;
    a statistical program installed in said electronic display device for receiving said first positive evaluation signal and said second positive evaluation signal, and generating a first evaluation value and a second evaluation value according to said first positive evaluation signal and said second positive evaluation signal, respectively, wherein said statistical program has a preset evaluation time period, wherein if said first evaluation value is greater than said second evaluation value after said evaluation time period, said first image file is transmitted to said social website, wherein if said second evaluation value is greater than said first evaluation value after said evaluation time period, said second image file is transmitted to said social website;
    a first negative evaluation button and a second negative evaluation button, wherein when said first negative evaluation button and said second negative evaluation button are pressed down, a first negative evaluation signal and a second negative evaluation signal are respectively generated, wherein when said first positive evaluation signal and said second positive evaluation signal are received by said statistical program once, said first evaluation value and said second evaluation value of said statistical program are respectively increased by 1, wherein when said first negative evaluation signal and said second negative evaluation signal are received by said statistical program once, said first evaluation value and said second evaluation value of said statistical program are respectively decreased by 1.

7. The electronic display device according to claim 6 wherein said first positive evaluation button and said second positive evaluation button are two physical buttons disposed on said surface of said electronic display device and arranged in the vicinity of said display screen, or said first positive evaluation button and said second positive evaluation button are two on-touch buttons shown on said display screen, wherein said first negative evaluation button and said second negative evaluation button are other two physical buttons disposed on said surface of said electronic display device and arranged in the vicinity of said display screen, or said first negative evaluation button and said second negative evaluation button are other two on-touch buttons shown on said display screen.

8. The electronic display device according to claim 6 further comprising a network module, which is disposed within said electronic display device and connected with said storage device, wherein said network module is in communication with said social website through Internet connection or in a wireless network communication manner, so that said first image file or said second image file stored in said storage device is copied and transmitted to said social website.

\* \* \* \* \*